United States Patent [19]

Skotte

[11] Patent Number: 4,474,348

[45] Date of Patent: Oct. 2, 1984

[54] CANTILEVER SPRING COUNTERBALANCE HINGE ASSEMBLY FOR AIRCRAFT DOORS

[75] Inventor: Karl G. Skotte, Bellevue, Wash.

[73] Assignee: The Boeing Company, Seattle, Wash.

[21] Appl. No.: 451,809

[22] Filed: Dec. 21, 1982

[51] Int. Cl.$^3$ ............................................. B64C 1/14
[52] U.S. Cl. .................................. 244/129.5; 16/311;
16/278; 49/386; 49/236
[58] Field of Search .......................... 244/129.5, 118.1;
49/236–245, 37, 386, 248; 16/303–309,
311–317, 277, 278, 371–374, 386, 284, 285, 282, 85

[56] References Cited

U.S. PATENT DOCUMENTS

| | | | |
|---|---|---|---|
| 1,831,800 | 11/1931 | Bales et al. | 49/386 |
| 2,611,922 | 9/1952 | Borman et al. | 16/278 |
| 2,751,636 | 6/1956 | Heinemann et al. | 244/129.5 |
| 2,763,900 | 9/1956 | McAfee et al. | 49/248 |
| 3,051,280 | 8/1962 | Bergman et al. | 49/249 |
| 3,115,685 | 12/1963 | Wheeler et al. | 49/386 |
| 3,289,244 | 12/1966 | Carey | 16/315 |

Primary Examiner—Galen L. Barefoot
Attorney, Agent, or Firm—Hughes, Barnard & Cassidy

[57] ABSTRACT

A simple, compact, cantilever-type spring (31) is mounted on the aircraft body structure (22) and is positioned so as to be deflected from its normally unstressed condition to a stressed state (31') by means of a radially projecting roller (39) mounted on and carried by the body-mounted torque tube (35) during at least the final increment of movement of the aircraft door (20) when it is being shifted to its fully opened position so as to store energy in the spring (31) for assisting in closing of the door (20) and counterbalancing the hinge moment attributable to the weight of the door (20) when the door is moving upslope during a door closing operation and for thereby minimizing the exertion of the on-board flight attendant (29) who is required to apply torque manually by pulling upwardly and outwardly thereon to overcome the door hinge moment until such time that the door (20) begins its downslope travel about the canted hinge axis (35). In a modified form of the invention, a second radially projecting roller (44) may be mounted on the body-mounted torque tube (35) for deflecting the cantilever-type spring (31) in the opposite direction (31") during a portion of the downslope travel of the door (20) during a door closing operation so that the energy stored therein can also provide assistance during the initial stages of door opening operation when the on-board flight attendant (29) is required to push the door (20) outwardly and upwardly along an upslope path of movement.

20 Claims, 9 Drawing Figures

CANTILEVER SPRING COUNTERBALANCE HINGE ASSEMBLY FOR AIRCRAFT DOORS

RELATED APPLICATIONS

Alex Maraghe and Allan William Opsahl, U.S. Application Ser. No. 448,720, filed Dec. 10, 1982, for "Spring Operated Counterbalance Hinge Assembly For Aircraft Doors".

Alex Maraghe, PCT Application No. PCT/US 82/01782, filed Dec. 21, 1982, for "Cam Operated Counterbalance Assembly For Aircraft Doors", the PCT counterpart of U.S. Application Ser. No. 474,651.

BACKGROUND OF THE INVENTION

1. Technical Field

The present invention relates generally to plug-type aircraft doors of the type adapted to swing through an arc approximating 180° about a generally vertical axis between a fully closed position flush with the aircraft fuselage and a fully opened position wherein the door is disposed in a plane essentially parallel to the aircraft fuselage centerline and with the door's outer skin surface in face-to-face relation with the outer skin surface of the fuselage; and, more particularly, to a simple, effective, compact and improved spring operated counterbalance hinge assembly for assisting on-board flight attendants who are required to manually open and close such doors—doors which today often weigh in excess of 300 pounds—and who, in the performance of their duties, must lift the relatively heavy door upwardly while simultaneously pushing outwardly to open the door and, similarly, must again lift the door upwardly while simultaneously pulling the door towards a closed position. Such movement of the door, which presents difficult and awkward problems for on-board flight attendants, is necessitated because the hinge axis for such doors must be inwardly canted from true vertical so that the operating components of the hinge assembly can be mounted within the curved configuration of the fuselage body structure.

2. Background Art

Conventional commercial aircraft are commonly provided with a multiplicity of ingress and egress openings in the aircraft fuselage with suitable doors being provided for closure of such openings. The doors vary widely in terms of their construction and operation. Commonly, such doors are plug-type doors which are designed to fit into the ingress/egress openings when the doors are closed so as to form a substantially smooth, continuous, uninterrupted, exterior skin surface. When such doors are opened, they are pivoted about the axis of a first torque tube assembly mounted in the door and moved slightly inboard, at which point the doors are pivoted simultaneously about the axes of both the first door-mounted torque tube assembly and a second torque tube assembly mounted in the fuselage body structure and to which the door is hingedly connected, with the door moving outwardly through the ingress/egress opening and swinging through an arc approximating 180° so that when fully opened, the door is entirely disposed outside of the aircraft fuselage, lying in a plane generally parallel to the aircraft centerline and with the door's outer skin surface essentially in face-to-face contact with the outer skin surface of the fuselage. In most instances today, such doors are manually operated by on-board flight attendants since most commercial aircraft carriers are reluctant to rely upon electrical actuating systems which are subject to electrical malfunction.

Moreover, as is well known to those skilled in the art, plug-type doors of the foregoing type, since they are required to conform in construction to the shape of the fuselage while providing access to the passenger compartment in the upper lobe of the aircraft, do not and cannot lie in a vertical plane either when fully closed or when fully opened; but, rather, they lie in a curvilinear plane having an inwardly canted chord line. As a consequence, the hinge assembly, including the fuselage mounted torque tube assembly, which must be entirely confined within the aircraft body structure, is inwardly canted from true vertical, often defining acute angles with the vertical of up to on the order of from 7° to 10°, or slightly more. This, of course, means that when the door is opened and pivoted through an arc about the generally vertical, inwardly canted hinge axis, the door must be initially pushed outwardly while it simultaneously moves upwardly; and, once it has moved through approximately two thirds of its permissible pivotal movement, the door begins to move downwardly toward the outer skin surface of the aircraft fuselage. Conversely, when the door is closed, it must be pulled upwardly and away from the aircraft fuselage; and, when it has transitted approximately one-third of its arcuate movement about the inwardly canted hinge axis, the door begins to move downwardly towards and into the ingress/egress opening in the fuselage, thus closing the same. As commercial aircraft get larger and larger, such doors similarly become larger; and, consequently, the doors, together with door mounted actuating systems and the requisite emergency evacuation equipment carried thereby, have become considerably heavier, often weighing on the order of 300 pounds or more.

Thus, when an on-board flight attendant attempts to open the door manually, he or she is, in effect, required to push the relatively heavy door uphill during the intial portion of door-opening movement until such time that the door reaches the highpoint in its path of travel, at which point the weight of the door tends to swing it more rapidly downhill towards the fully open position. Even more difficult for the on-board flight attendant is the problem of closing the door which now must be pulled upwardly and away from the fuselage by the attendant, who is standing inside the aircraft, until the door again reaches it highpoint during pivotal movement about the inwardly canted hinge axis, at which point the weight of the door serves to cause it to move rapidly in a downward and inward direction towards the ingress/egress opening.

The foregoing problem tends to be uniquely applicable to aircraft where the door's hinge axis must lie within, and conform to, the chord of the curved fuselage body structure and, consequently, the hinge axis must define an acute angle with the vertical. Cabinet doors, housing doors, and similar type doors, on the other hand, do not face this type of problem because such doors are generally hinged about a truly vertical axis, thereby permitting movement of the door through the entire range of movement without having to lift the weight of the door in an upward direction during any portion of door opening or closure. Nevertheless, such doors have commonly included spring-type assist mechanisms, which have generally been provided to insure that the door is biased to at least one of a fully closed and/or a fully opened position. For example, Jordan, U.S. Pat. No. 1,028,571 and Bales et al, U.S. Pat. No. 1,831,800 each disclose arrangements wherein a door (a vehicle door in Jordan and a cabinet door in Bales et al) will generally be in a neutral unbiased position when it is halfway opened, but which moves in either direction from that neutral half opened position as a consequence of the provision of spring mechanisms which serve to bias the door from the neutral position towards both a fully opened and a fully closed position.

In Van Dillen, U.S. Pat. No. 2,028,424, a swinging door closing device is illustrated which employs a casing mounted mechanism biased by a pair of oppositely wound clock springs such that swinging movement of the door in one direction or the other tends to wind a respective one of the two clock springs to establish a restoring moment tending to bias the door towards the closed position.

Lundine, U.S. Pat. No. 2,557,749, discloses a cantilever-type spring which is mounted on a cabinet structure and which has its free end in engagement with the door. The arrangement is such that when the door is pivoted from a closed position, the spring is deflected to create a restoring moment for automatically closing the door; but, when the door is fully opened, the spring includes a detent-like arrangement for capturing the door edge and holding the door in its fully opened position, Other patents of general interest illustrating spring-type biasing arrangements for non-aircraft doors are those found in, for example: Chamberlain, U.S. Pat. No. 2,587,287; MacDonald, U.S. Pat. No. 3,205,532; Murphy et al, U.S. Pat. No. 3,918,755; and, Wheeler et al, U.S. Pat. No. 3,115,685; the latter two patents illustrating combined spring-like camming arrangements and cam follower rollers for attaining the desired biasing motion to move a door towards a fully closed and/or a fully opened position.

Insofar as aircraft are concerned, counterbalance systems have also been known; and, they tend to vary widely dependent upon the type of door involved. In, for example, a plug-type door of the type adapted to move inwardly and upwardly along tracks disposed on the interior of the aircraft, it is common to provide a counterbalance system including cables and pulleys for minimizing the amount of exertion required to raise the heavy door upwardly along its tracks. Similarly, in Moses, U.S. Pat. No. 4,086,726, a counterbalance system is provided for an aircraft door which is intended to swing about a horizontal axis in an outward and downward direction for providing a ramp or steps permitting access to the aircraft.

In recent years, large commercial aircraft have faced problems similar to the problem faced and resolved by the present invention. In those types of door counterbalancing systems, the particular aircraft body structure has provided sufficient room to accommodate a plurality of coil springs—generally three such springs—coaxially and in generally end-to-end relation about the torque tube carried within the fuselage body structure. One of such coil springs was generally wound in a direction to permit biasing of the door in one direction during the initial portion of either door opening or closing movement, while the remaining two springs served to provide the biasing forces required during the initial portion of movement in the opposite direction. However, with present day aircraft where the doors are characterized by their large size and weight and wherein the aircraft aerodynamic contour is such that the hinge axis defines a significant acute angle, the weight of the doors has required the use of increased bearing supports, and supplemental snubber mechanisms, and the like, which provide retarding forces when the door is moving in either direction in a downward path so as to protect the door, the fuselage and the actuating mechanisms from damage due to sudden jars or shocks. Because of such mechanisms, and the constrained nature of the space within the fuselage body structure, it has been found that there simply isn't sufficient space for such coil springs in surrounding relationship to the body mounted torque tube.

SUMMARY OF THE INVENTION

A simple, compact, cantilever-type spring is mounted on the aircraft body structure and is positioned so as to be deflected from a normally unstressed condition to a stressed state by means of a radially projecting roller mounted on and carried by the body-mounted torque tube during at least the final increment of movement of the door when it is being shifted to its fully opened position so as to store energy in the spring for assisting in closing of the door and counterbalancing the hinge moment attributable to the weight of the door when the door is moving upslope during a door closing operation and for thereby minimizing the exertion of the on-board flight attendant who is required to apply torque manually to overcome the door hinge moment until such time that the door begins its downslope travel about the canted hinge axis. In a modified form of the invention, a second radially projecting roller may be mounted on the body-mounted torque tube for deflecting the cantilever-type spring in the opposite direction during a portion of the downslope travel of the door during a door closing operation so that the energy stored therein can provide assistance during the initial stages of door opening operation when the on-board flight attendant is required to push the door outwardly and through an upslope path of movement.

Accordingly, it is a general aim of the present invention to provide a simple, compact, lightweight, yet highly effective spring operated counterbalance mechanism which is capable of minimizing the exertion required by on-board flight attendants in closing plug-type doors on aircraft and which can, if desired, also be designed to assist in opening such doors; yet which does not occupy a significant amount of space within the aircraft body structure and which readily permits the incorporation of necessary auxiliary equipment of the type commonly associated with the hinge mechanisms for such doors.

DESCRIPTION OF THE DRAWINGS

These and other objects and advantages of the present invention will become more readily apparent upon reading the following detailed description and upon reference to the attached drawings, in which.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and alternatives falling within the spirit and scope of the invention as expressed in the appended claims.

DETAILED DESCRIPTION

Environment Of The Invention

Figure 1:
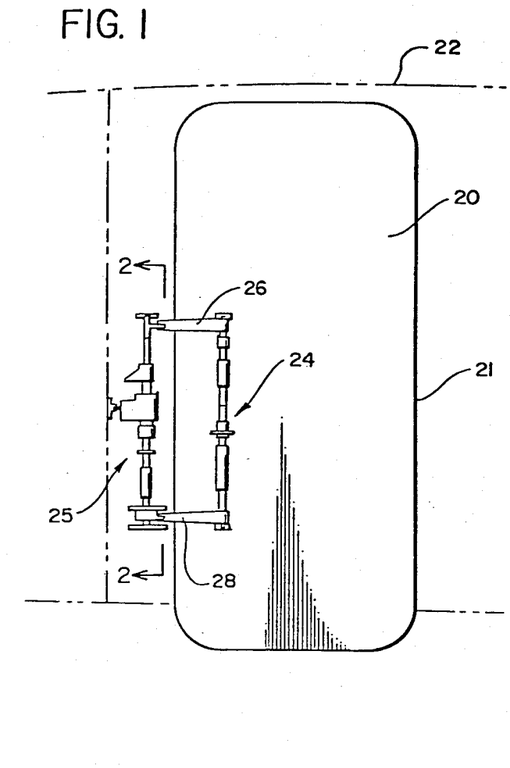
FIG. 1 is an external, highly diagrammatic, fragmentary side elevational view of a portion of a conventional large capacity passenger aircraft fuselage, shown in phantom lines, and depicting in solid lines the location of a conventional passenger plug-type ingress/egress door of the type adapted to move inwardly and outwardly during door closing and opening movements, respectively, and also depicting in solid line diagrammatic form the relative locations of the fuselage, or body-mounted, and the door-mounted torque tube assemblies which form part of a conventional door hinge assembly.
Figure 2:
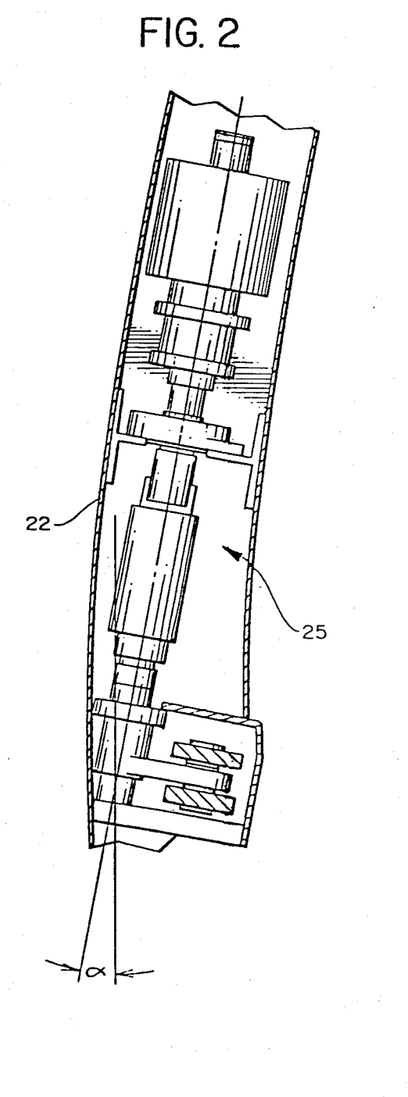
FIG. 2 is a diagrammatic sectional view taken substantially along the line 2—2 in FIG. 1 here illustrating the contour of the aircraft fuselage at the passenger ingress/egress door location wherein such contour mandates that the torque tube/hinge assembly be canted inwardly—i.e., that it be oriented at an acute angle to the vertical—thus necessitating upward movement of the door about the inclined hinge line during the initial portion of both door opening movement and door closing movement.
Figure 3:
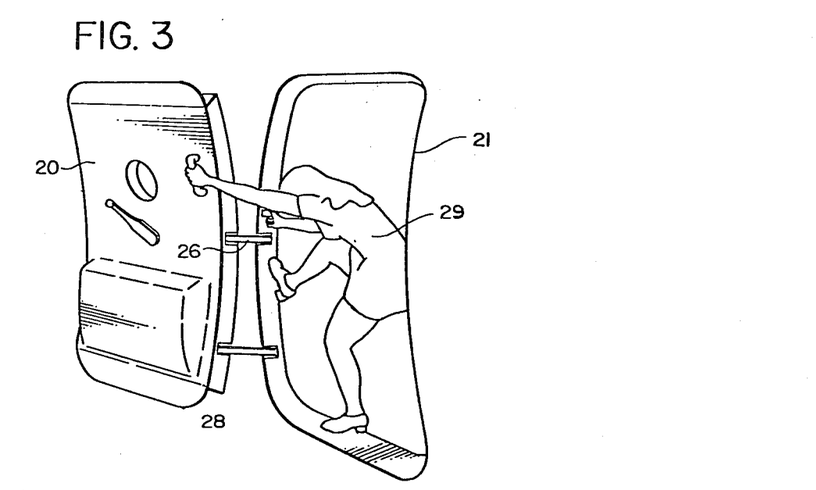
FIG. 3 is a fragmentary perspective view here depicting an on-board aircraft attendant attempting to initiate closing movement of a fully opened aircraft passenger door.

Turning first to FIGS. 1 and 2, conjointly, there has been illustrated in simplified diagrammatic form a typical aircraft plug-type door 20 of the type adapted to be swung inwardly and outwardly of the aircraft about a generally vertical axis for closing and opening an ingress/egress opening 21 formed in the fuselage 22 of the aircraft. As here illustrated, the exemplary construction includes a first door-mounted torque tube assembly, generally indicated at 24 in FIG. 1, and a second torque tube assembly, generally indicated at 25 in FIGS. 1 and 2, mounted in stationary bearings integrally secured to the fuselage 22 body structure, with the two torque tube assemblies being interconnected by upper and lower hinge arms 26, 28, respectively. As is evident upon inspection of FIG. 2, the curved nature of the aircraft fuselage 22 in the region of the ingress/egress opening 21 (FIG. 1) disposed in the upper lobe passenger compartment is such that both torque tube assemblies but, especially the body-mounted torque tube assembly 25, must be inwardly canted, defining an acute angle $\alpha$ with the vertical. Moreover, as will be apparent to those skilled in the art, the exemplary plug-type door 20 of the type here shown is conventionally designed to be opened by unlocking the door and rotating the door about the axis of the door-mounted torque tube assembly 24, so as to move the door inwardly into the passenger compartment from a fully closed and sealed position, at which point the door is rotated simultaneously about the axes of both the door-mounted torque tube assembly 24 and the body-mounted torque tube assembly 25 with the door moving outwardly through the ingress/egress opening 21 and swinging in an arc approximately 180°—here, the arc is actually about 173°—about the hinge axis. Because the hinge axis is inwardly canted defining an acute angle $\alpha$ which is on the order of approximately 10°, as the door rotates it must move along an uphill slope during at least a portion of both its opening travel and its closing travel. In practice, during opening of the door, it tends to move in an upward and outward direction during the initial portion of motion through an arc approximating 123°; and, thereafter, it moves along a downward slope about the inwardly canted hinge axis through an arc of about 50° until it lies in the fully open position shown in FIG. 3. Thus, during closing movement, the on-board flight attendant 29 is required to grasp the door 20, which will generally weigh on the order of 300 pounds or more, and move it simultaneously outwardly away from the fuselage and upwardly along an inclined slope through an arc approximating 50°, at which point the door beings to move towards the ingress/egress oepning 21 along a downward slope. Unfortunately, the on-board location of the flight attendant makes such door movement extremely difficult because of the exceedingly poor leverage that he or she is able to apply.

Figure 4:
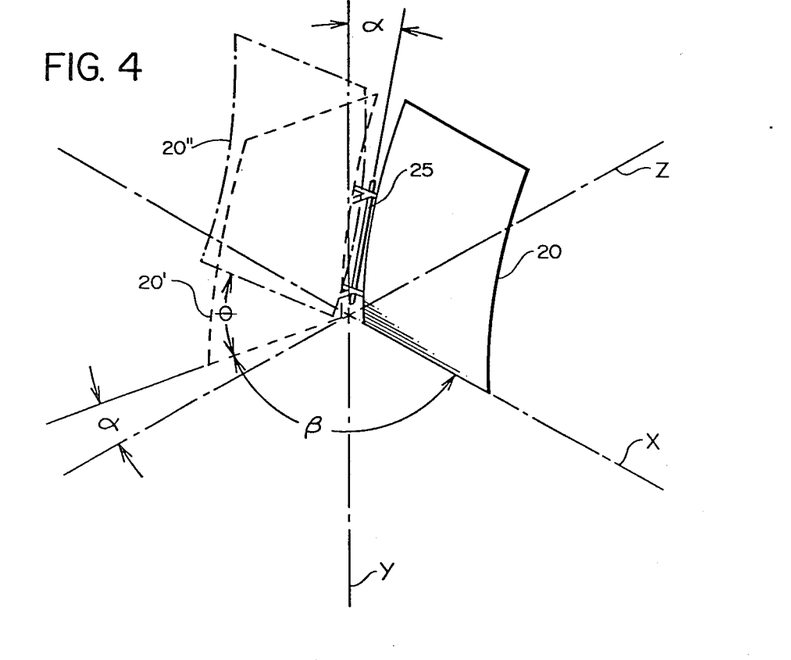
FIG. 4 is a diagrammatic perspective line drawing illustrative of the movement of a structural element—for example, an aircraft passenger door—about a simple canted or non-vertical hinge axis, and in XYZ coordinate space, between fully closed, partially closed or opened, and fully opened positions, respectively illustrated in solid lines, broken lines and dash-dot lines.

The foregoing problem may be more easily understood by reference to the diagrammatic line drawing set forth in FIG. 4 wherein a structural member such as an aircraft door 20 has been illustrated in solid lines in the fully closed position, in broken lines in the partially open position shown at 20', and in dash-dot lines in the fully open position shown at 20'', with the door being adapted for movement in XYZ coordinate space about the axis of a simple torque tube assembly 25 disposed at an acute angle $\alpha°$ on the order of 10° with the vertical axis Y. Thus, when the door is moved from the closed position indicated at 20 to the partially open position indicated at 20', it must be moved through the angle of rotation $\beta$; and, during that portion of door movement about the inwardly canted axis of the torque tube assembly 25, the door moves uphill so that its bottom edge defines an acute angle $\alpha$ with the XZ plane. Continued opening movement of the door from the position 20' to the fully opened position 20" requires movement of the door through an angle of rotation $\theta$ until such time as it is fully opened, at which point its bottom edge is again generally parallel to the XZ plane. Conversely, when the door is moved from the fully open position indicated at 20" to the fully closed position indicated at 20, it first moves in an uphill direction through the angle of rotation $\theta$; and, thereafter, the door moves downwardly through the angle of rotation $\beta$ until fully closed. During downward movement of the door through the angle $\beta$ in closing and the angle $\theta$ in opening, the weight of the door tends to aid in door movement; but, during upward movement of the door through the angle $\beta$ when the door is opening and through the angle $\theta$ when the door is closing, the weight of the door functions to resist the forces applied by the attendant to move the door. Accordingly, one embodiment of the present invention is concerned with a counterbalance mechanism that tends to minimize or counterbalance the resistance forces created by the weight of the door as the on-board flight attendant moves the door through its upward path of movement in a door closing mode of operation. A second embodiment of the present invention involves a modification wherein the cantilever spring-type counterbalance mechanism also functions to assist the on-board flight attendant during movement of the door along at least part of its upslope travel when the door is being opened.

Counterbalance Mechanism Embodying The Present Invention

Figure 5:
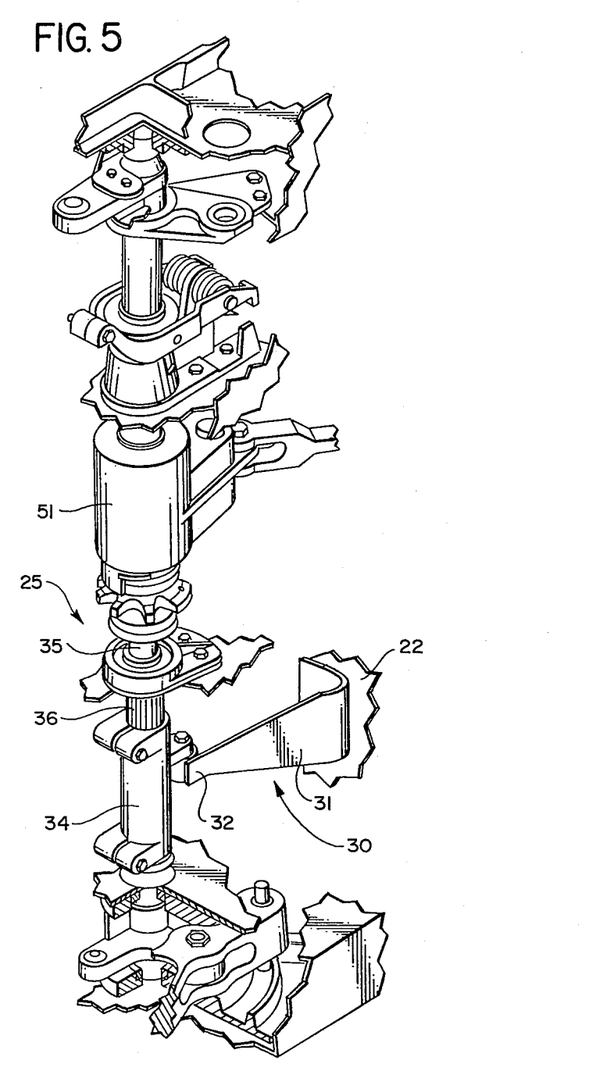
FIG. 5 is a fragmentary perspective view illustrating details of the body-mounted torque tube assembly employed with the spring biased hinge mechanism of the present invention.
Figure 6:
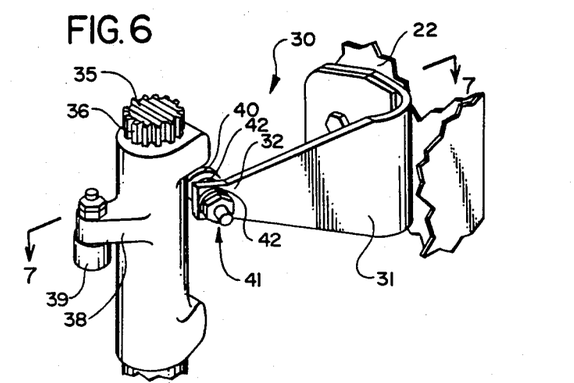
FIG. 6 is an enlarged fragmentary perspective view of a portion of the body-mounted torque assembly and a cooperable spring biasing arrangement for minimizing the physical exertion required to close a fully opened door during the initial stages of door closing movement.
Figure 7:
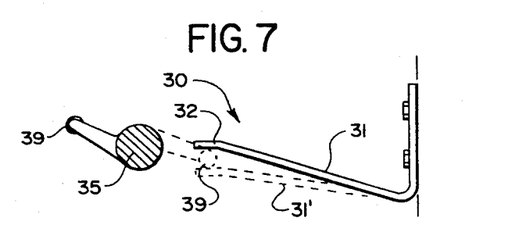
FIG. 7 is a sectional view taken substantially along the line 7—7 in FIG. 6, here illustrating the position of the torque tube assembly and spring biasing mechanism in solid lines when the passenger door is fully closed and in broken lines when the door is fully opened.

In accordance with the important aspects of the present invention, and as best illustrated by reference to FIGS. 5 through 7 conjointly, a simple, highly effective, compact, spring operated counterbalance mechanism, generally indicated at 30 in the drawings, is provided for establishing a negative hinge moment which counteracts the positive hinge moment attributable to the weight of the door during movement of the door along at least part of its uphill slope as the door rotates about the inwardly canted hinge axis during door closing movement. To this end, a cantilever spring 31 is rigidly secured at one end to the fuselage body structure 22 with the unrestrained, free, springable end 32 of spring 31 being directed towards, but terminating slightly spaced from, the inwardly canted body-mounted torque tube assembly 25. In order to deflect the cantilever-type spring 31 for storing energy therein when the aircraft door is being fully opened, a generally cylindrical sleeve 34 is rigidly and nonrotatably secured to the torque tube 35—for example, by means of splines 36 best shown in FIGS. 5 and 6—and is provided with an outwardly or laterally extending shoulder 38 upon which is mounted a roller 39 positioned so as to engage the free springable end 32 of the cantilever-type spring 31 as the door 20 is moving in a downslope direction through the latter portion of the angle of rotation $\theta$ (FIG. 4) and towards a fully open position.

Thus, as best illustrated by reference to FIGS. 6 and 7 conjointly, when the aircraft door is fully closed, the body-mounted torque tube assembly 25, torque tube 35, torque tube roller 39 and cantilever spring 31 are in the position illustrated in FIG. 6 and in solid lines in FIG. 7. As the door is swung from a fully closed position towards a fully open position, torque tube 35 is rotated in a clockwise direction as viewed in FIGS. 6 and 7; and, shortly prior to reaching the fully opened position, roller 39 engages the free extremity 32 of the cantilever spring 31 and deflects the spring to the stressed position shown at 31' in FIG. 7, thus storing energy therein. Consequently, when the on-board flight attendant desires to close a fully opened door, he or she will grasp the door handle and commence pulling the door along its upslope path of movement through the angle of rotation $\theta$ (FIG. 4), an operation which, absent the present invention, requires significant manual exertion. However, with the present invention, the energy stored in the deflected spring 31 serves to impart rotational torque to the torque tube 35 in a counterclockwise direction as viewed in FIG. 7; and, the torque applied by the deflected spring serves to minimize the amount of manually applied torque that must be imparted by the on-board flight attendant.

In carrying out the present invention, provision may be made for varying the particular door angle at which spring deflection commences, and thus controlling the amount of spring deflection. To this end, and as best illustrated in FIG. 6, a spring bumper 40 may be secured to the outboard free extremity 32 of spring 31 by means of a threaded nut and bolt, generally indicated at 41, with a plurality of washers 42 being interposed between the bumper 40 and spring and/or between the spring and nut. Thus, washers may be added and/or substracted for the purpose of optimizing the position at which the torque tube carried roller 39 engages the bumper 40 and thus initiates deflection of spring 31.

Figure 8:
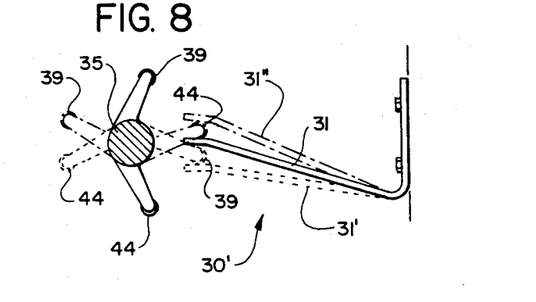
FIG. 8 is a sectional view similar to FIG. 7, but here illustrating a modified form of the invention in which the spring biasing mechanism serves to provide biasing forces for assisting the attendant during the initial stages of both manual opening of the door and manual closing of the door; with the biasing mechanism and torque tube here being shown in solid lines when the door is partially opened, in broken lines when the door is fully opened, and in dash-dot lines when the door is in the fully closed position; and, FIG. 9 is a graphic representation of the forces required to open and close the aircraft passenger door when manufactured in accordance with the present invention illustrating the angular position of the door in degrees (0° representative of a fully closed door and approximately 173° representative of a fully opened door) along the abscissa, and hinge moment—i.e., the requisite force to move the door—in inch/pounds along the ordinate.

Referring to FIG. 8, a slightly modified form of the invention has been illustrated wherein the cantilever-type spring 31 functions to store energy for imparting torque to the torque tube 35 during the initial portions of both door closing and door opening movement, during both of which the on-board flight attendant is required to move the door in an upslope direction. Thus, as here illustrated, a second roller 44 is integrally mounted on the torque tube 35 for rotation therewith and positioned such that when the door is closed—i.e., moved from a fully opened position towards a fully closed position—rotation of the torque tube 35 in a counterclockwise direction as viewed in the drawing causes the roller 44 to deflect spring 31 from the non-stressed position indicated in solid lines to the deflected position indicated at 31".

Thus, the arrangement is such that when the aircraft door is moving through the latter stages of the angle of rotation $\beta$ (FIG. 4) in a downward closing direction, roller 44 on sleeve 34 engages the free extremity of spring 31 and deflects the spring to the position 31" indicated in FIG. 8 as the door moves to its fully closed position. Consequently, when the on-board attendant attempts to open the fully closed door and push the door outwardly and upwardly through the angle $\beta$ (FIG. 4), the thus deflected spring 31 applies torque tending to rotate the sleeve 34 and, therefore, the torque tube 35 in a clockwise direction during the initial stages of upslope movement of the door, thereby minimizing the clockwise torque that must be manually applied by the on-board flight attendant. As the door reaches the highpoint in its path of opening movement and commences to move downhill through the angle of rotation θ (FIG. 4), roller 39 ultimately engages the free extremity 32 of spring 31 and serves to deflect the spring to the position shown at 31' (FIGS. 7 and 8), thus again storing energy in spring 31. Consequently, when the on-board attendant attempts to close the door and move it upwardly through the angle of rotation θ (FIG. 4), spring 31 applies a counterbalancing torque to the torque tube 35 urging the latter in a counterclockwise direction by virtue of the engagement between roller 39 and the deflected free extremity of spring 31, thereby minimizing the counterclockwise torque that must be manually applied by the on-board flight attendant.

Figure 9:
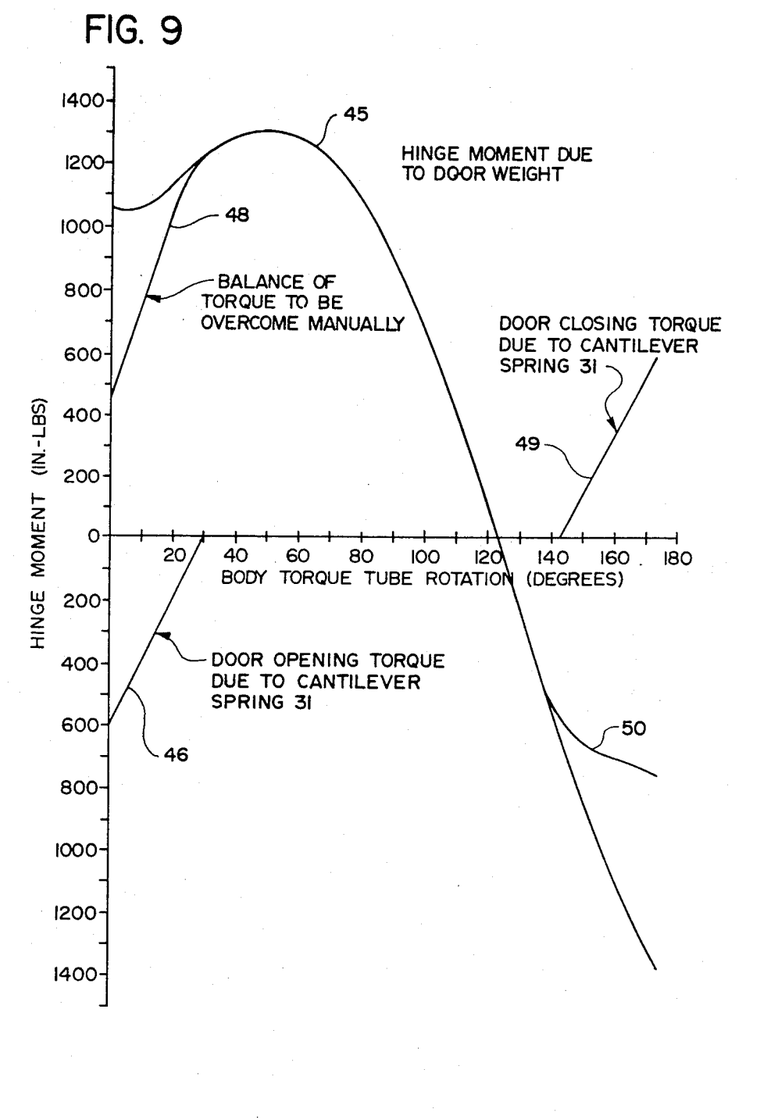

Referring next to FIG. 9, the advantages attained by the present invention will become more readily understandable. Thus, as here shown, it will be noted that the hinge moment attributable to the weight of the door 20 is represented by the curve 45. Considering the force required to overcome hinge moment during door opening movement, it will be noted that approximately 1,070 in./lbs. are initially required to initiate movement of the door 20 from a fully closed position; and, as the door progressively moves through angle β (FIG. 4), the amount of force required gradually increases throughout the first 40° to 45° of the door movement and then progressively decreases, reaching 0 in./lbs. when the door 20 reaches its highpoint—i.e., a point where the angle β (FIG. 4) is approximately 123°—at which point the door commences downward movement and the weight of the door itself provides the force necessary to fully open the door. At the same time, however, the deflected spring—i.e., the spring in the deflected position 31" shown in FIG. 8—provides a linearly decreasing negative torque ranging from approximately 600 in./lbs. when the door is fully closed to 0 in./lbs. when the door has moved through approximately 30° of rotational movement as indicated by curve 46. As a consequence, the resultant torque which must be overcome manually by the on-board flight attendant is, therefore, substantially reduced during the first 30° of opening door movement from the hinge moment attributable to door weight as represented by the curve 42 to that represented by the resultant curve indicated at 48. Similarly, during door closing movement, the cantilever spring 31 provides torque represented by the curve 49 as the door moves through the first 30° of the angle of rotation θ (FIG. 4) from a fully opened position, thus substantially reducing the amount of manually applied torque that must be imparted by the on-board attendant as indicated by the resultant curve 50.

Thus, those skilled in the art will appreciate that there has herein been described a simple, extremely compact, and exceedingly effective cantilever-type spring counterbalance system which minimizes the torque that must be imparted to the door by the on-board flight attendant during those portions of door closing and opening movement when the door is moving uphill. Because of the simple, compact nature of the counterbalance mechanism 30, the body mounted torque tube assembly 25 may readily accommodate auxiliary equipment such as the conventional snubber mechanism indicated at 51 in FIG. 5 for retarding and breaking the door 20 as it moves through its downwardly sloped paths of movement during both door opening and door closing movement. Moreover, it will be appreciated that other modifications may be made without departing from the spirit and scope of the invention as expressed in the appended claims. For example, if desired one could mount the cantilever-type spring or springs on the torque tube positioned for engagement with and deflection by one or more body-mounted stops.

What is claimed is:

1. In combination with an aircraft door of the type adapted to be shifted outwardly and inwardly to open and close an ingress/egress opening in the aircraft fuselage during door opening and closing operations, respectively, about a generally vertical but inwardly canted hinge axis defined by a torque tube mounted in said fuselage with freedom for rotation about said axis and drivingly coupled to said door by hinge link defining means, and wherein said door is required to move upwardly during the initial portion of both door opening movement and door closing movement as a direct result of pivotal door movement about said generally vertical inwardly canted hinge axis, the improvement comprising a spring operated door counterbalance hinge assembly comprising:

(a) cantilever spring defining means;
(b) spring deflection means;
(c) one of said cantilever spring defining means and said spring deflection means being fixedly secured to said fuselage; and,
(d) the other of said cantilever spring defining means and said spring deflection means being fixedly secured to and projecting laterally from said torque tube for rotation therewith and being positioned thereon such that said spring deflection means engages said cantilever spring defining means during at least that portion of torque tube rotation coincident with the downslope movement of said door about said generally vertical inwardly canted hinge axis in at least one of a door closing operation and a door opening operation for deflecting said cantilever spring defining means and storing energy therein so that when said door is moved in an upslope direction during at least one of a door opening operation and a door closing operation, said deflected cantilever spring defining means cooperates with said spring deflection means to impart rotational torque to said torque tube in the direction of rotation thereof for minimizing the amount of torque that must be manually applied to rotate said door about said inwardly canted hinge axis in an upslope direction.

2. The combination as set forth in claim 1 wherein said door moves upslope through an angle of rotation β during the initial portion of door opening movement, downslope through an angle of rotation θ during the latter portion of door opening movement, upslope through the angle of rotation θ during the initial portion of door closing movement, and downslope through the angle of rotation β during the latter portion of door closing movement.

3. The combination as set forth in claim 2 wherein said cantilever spring defining means and said spring deflection means interact to deflect said cantilever spring defining means during at least a portion of downslope movement of said door through said angle of rotation θ for deflecting said cantilever spring defining means when said door is fully opened and storing energy therein so that upon manual rotation of said door from a fully opened position towards a fully closed position, the energy stored in said deflected cantilever spring defining means imparts a rotational torque to said torque tube during at least a portion of upslope movement of said door through said angle $\theta$ for minimizing the amount of manually applied torque required to close said door.

4. The combination as set forth in claim 2 wherein said cantilever spring defining means and said spring deflection means interact to deflect said cantilever spring defining means during at least a portion of downslope movement of said door through said angle of rotation $\beta$ for deflecting said cantilever spring defining means when said door is fully closed and storing energy therein so that upon manual rotation of said door from a fully closed position to a fully opened position, the energy stored in said deflected cantilever spring defining means imparts a rotational torque to said torque tube during at least a portion of upslope movement of said door through said angle $\beta$ for minimizing the amount of manually applied torque required to open said door.

5. The combination as set forth in claim 2 wherein said cantilever spring defining means and said spring deflection means interact to deflect said cantilever spring defining means during at least a portion of downslope movement of said door through said angles of rotation $\theta$ and $\beta$ for deflecting said cantilever spring defining means when said door is fully opened and fully closed and storing energy therein so that upon manual rotation of said door between fully opened and fully closed positions, the energy stored in said deflected cantilever spring defining means imparts a rotational torque to said torque tube during at least a portion of upslope movement of said door through said angles $\beta$ and $\theta$ for minimizing the amount of manually applied torque required to open and close said door.

6. The combination as set forth in claim 3 wherein said cantilever spring defining means and said spring deflection means interact to impart rotational torque to said torque tube throughout a rotational angle on the order of about 30° as said door moves in an upslope closing direction through said angle $\theta$.

7. The combination as set forth in claim 4 wherein said cantilever spring defining means and said spring deflection means interact to impart rotational torque to said torque tube throughout a rotational angle on the order of about 30° as said door moves in an upslope opening direction through said angle $\beta$.

8. The combination as set forth in claim 5 wherein said cantilever spring defining means and said spring deflection means interact to impart rotational torque to said torque tube throughout a rotational angle on the order of about 30° as said door moves in an upslope closing direction through said angle $\theta$ and in an upslope opening direction through said angle $\beta$.

9. The combination as set forth in claim 1 wherein at least one of said cantilever spring defining means and said spring deflection means includes means for controllably adjusting the angle of deflection of said cantilever spring defining means.

10. The combination as set forth in claim 1 wherein said spring deflection means is fixedly secured to said torque tube and said cantilever spring defining means is fixedly secured to said fuselage and extends into the path of rotational movement of said spring deflection means as said torque tube rotates.

11. The combination as set forth in claim 10 wherein said door moves upslope through an angle of rotation $\beta$ during the initial portion of door opening movement, downslope through an angle of rotation $\theta$ during the latter portion of door opening movement, upslope through the angle of rotation $\theta$ during the initial portion of door closing movement, and downslope through the angle of rotation $\beta$ during the latter portion of door closing movement.

12. The combination as set forth in claim 11 wherein said cantilever spring defining means and said spring deflection means interact to deflect said cantilever spring defining means during at least a portion of downslope movement of said door through said angle of rotation $\theta$ for deflecting said cantilever spring defining means when said door is fully opened and storing energy therein so that upon manual rotation of said door from a fully opened position towards a fully closed position, the energy stored in said deflected cantilever spring defining means imparts a rotational torque to said torque tube during at least a portion of upslope movement of said door through said angle $\theta$ for minimizing the amount of manually applied torque required to close said door.

13. The combination as set forth in claim 11 wherein said cantilever spring defining means and said spring deflection means interact to deflect said cantilever spring defining means during at least a portion of downslope movement of said door through said angle of rotation $\beta$ for deflecting said cantilever spring defining means when said door is fully closed and storing energy therein so that upon manual rotation of said door from a fully closed position to a fully opened position, the energy stored in said deflected cantilever spring defining means imparts a rotational torque to said torque tube during at least a portion of upslope movement of said door through said angle $\beta$ for minimizing the amount of manually applied torque required to open said door.

14. The combination as set forth in claim 11 wherein said cantilever spring defining means and said spring deflection means interact to deflect said cantilever spring defining means during at least a portion of downslope movement of said door through said angles of rotation $\theta$ and $\beta$ for deflecting said cantilever spring defining means when said door is fully opened and fully closed and storing energy therein so that upon manual rotation of said door between fully opened and fully closed positions, the energy stored in said deflected cantilever spring defining means imparts a rotational torque to said torque tube during at least a portion of upslope movement of said door through said angles $\beta$ and $\theta$ for minimizing the amount of manually applied torque required to open and close said door.

15. The combination as set forth in claim 12 wherein said cantilever spring defining means and said spring deflection means interact to impart rotational torque to said torque tube throughout a rotational angle on the order of about 30° as said door moves in an upslope closing direction through said angle $\theta$.

16. The combination as set forth in claim 13 wherein said cantilever spring defining means and said spring deflection means interact to impart rotational torque to said torque tube throughout a rotational angle on the order of about 30° as said door moves in an upslope opening direction through said angle $\beta$.

17. The combination as set forth in claim 14 wherein said cantilever spring defining means and said spring deflection means interact to impart rotational torque to said torque tube throughout a rotational angle on the order of about 30° as said door moves in an upslope closing direction through said angle $\theta$ and in an upslope opening direction through said angle $\beta$.

18. The combination as set forth in claim 10 wherein at least one of said cantilever spring defining means and said spring deflection means includes means for controllably adjusting the angle of deflection of said cantilever spring defining means.

19. The combination as set forth in claim 10 wherein said aircraft door is a plug-type door.

20. The combination as set forth in claim 11 wherein said aircraft door is a plug-type door.

* * * * *